(12) United States Patent
Griessbaum et al.

(10) Patent No.: US 9,494,676 B2
(45) Date of Patent: Nov. 15, 2016

(54) PAIRED ZF SAMPLING FOR PULSE RUNNING TIME FILLING LEVEL SENSOR

(75) Inventors: Karl Griessbaum, Muehlenbach (DE); Josef Fehrenbach, Haslach (DE); Roland Welle, Oberwolfach (DE); Juergen Haas, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 11/625,946

(22) Filed: Jan. 23, 2007

(65) Prior Publication Data
US 2007/0186678 A1 Aug. 16, 2007

Related U.S. Application Data

(60) Provisional application No. 60/772,701, filed on Feb. 13, 2006.

(30) Foreign Application Priority Data

Feb. 13, 2006 (DE) .................. 10 2006 006 572

(51) Int. Cl.
- G01F 23/00 (2006.01)
- G01S 7/285 (2006.01)
- G01F 23/26 (2006.01)

(Continued)

(52) U.S. Cl.
CPC ........... *G01S 7/285* (2013.01); *G01F 23/0061* (2013.01); *G01F 23/0076* (2013.01); *G01F 23/266* (2013.01); *G01F 23/282* (2013.01); *G01F 23/284* (2013.01); *G01F 23/2962* (2013.01); *G01S 7/2922* (2013.01); *G01S 7/5273* (2013.01); *G01S 13/103* (2013.01); *G01S 13/88* (2013.01); *G01S 15/88* (2013.01)

(58) Field of Classification Search
CPC ............. G01F 23/284; G01F 23/0076; G01F 23/266; G01F 23/0061; G01F 23/282; G01S 15/88
USPC .............. 702/50, 55, 66; 73/149, 290 R, 291
See application file for complete search history.

(56) References Cited

U.S. PATENT DOCUMENTS

| | | | |
|---|---|---|---|
| 4,521,778 A | 6/1985 | Knepper | |
| 5,014,122 A * | 5/1991 | Otto | 375/240.25 |

(Continued)

FOREIGN PATENT DOCUMENTS

| | | |
|---|---|---|
| CN | 1 115 922 | 1/1996 |
| CN | 1 225 468 | 8/1999 |

(Continued)

OTHER PUBLICATIONS

Definition of Ultrasonic, Answers.com, printed Nov. 16, 2008.*

(Continued)

*Primary Examiner* — Michael Nghiem
(74) *Attorney, Agent, or Firm* — Fay Kaplun & Marcin, LLP (57) ABSTRACT

A pulse running time filling level sensor includes a sampling device for sampling an IF signal at discrete instants and for converting the sampling values into digital sampling values, and a digital signal processing device for subsequent processing of the digital sampling values by calculating at least one new value characterizing the IF curve from respectively exactly two digital sampling values.

18 Claims, 8 Drawing Sheets

(51) Int. Cl.
*G01F 23/28* (2006.01)
*G01F 23/284* (2006.01)
*G01F 23/296* (2006.01)
*G01S 7/292* (2006.01)
*G01S 7/527* (2006.01)
*G01S 13/10* (2006.01)
*G01S 13/88* (2006.01)
*G01S 15/88* (2006.01)

(56) References Cited

U.S. PATENT DOCUMENTS

| | | | | |
|---|---|---|---|---|
| 5,309,514 | A | * | 5/1994 | Johnson et al. ............. 725/116 |
| 5,323,361 | A | | 6/1994 | Elle et al. |
| 5,442,353 | A | | 8/1995 | Jackson |
| 5,594,341 | A | * | 1/1997 | Majidi-Ahy et al. ......... 324/322 |
| 5,628,319 | A | | 5/1997 | Koch et al. |
| 5,805,460 | A | * | 9/1998 | Greene et al. ................. 702/79 |
| 5,861,831 | A | * | 1/1999 | Murden et al. ............... 341/139 |
| 5,864,313 | A | * | 1/1999 | Speck et al. ................... 342/98 |
| 6,087,978 | A | * | 7/2000 | Lalla et al. .................. 342/124 |
| 6,097,259 | A | * | 8/2000 | Saito et al. .................. 332/103 |
| 6,240,433 | B1 | | 5/2001 | Schmookler et al. |
| H2015 | H | * | 3/2002 | Waters .......................... 375/240 |
| 6,614,856 | B1 | * | 9/2003 | Meyer ........................... 375/316 |
| 6,734,819 | B2 | | 5/2004 | Spanke ......................... 342/124 |
| RE38,876 | E | * | 11/2005 | Samueli et al. ............. 375/235 |
| 7,203,718 | B1 | * | 4/2007 | Fu et al. ....................... 708/622 |
| 7,333,900 | B2 | * | 2/2008 | Welle et al. ................... 702/55 |
| 7,515,896 | B1 | * | 4/2009 | Sorrells et al. ............... 455/313 |
| 7,605,748 | B2 | * | 10/2009 | Fehrenbach et al. ........ 342/124 |
| 7,639,176 | B2 | * | 12/2009 | Fehrenbach et al. ........ 342/124 |
| 7,853,419 | B2 | * | 12/2010 | Schultheiss .................... 702/75 |
| 2002/0176522 | A1 | * | 11/2002 | Fan ............................... 375/340 |
| 2003/0021186 | A1 | | 1/2003 | Lyon |
| 2003/0030868 | A1 | * | 2/2003 | Sasai et al. ................... 359/154 |
| 2003/0052795 | A1 | | 3/2003 | Schlick et al. |
| 2003/0146867 | A1 | | 8/2003 | Kornle et al. |
| 2003/0198476 | A1 | * | 10/2003 | Ohya et al. ................... 398/141 |
| 2005/0007879 | A1 | * | 1/2005 | Nishida ........................... 367/99 |
| 2005/0168379 | A1 | * | 8/2005 | Griessbaum et al. ........ 342/124 |
| 2007/0186678 | A1 | * | 8/2007 | Griessbaum et al. .......... 73/861 |
| 2015/0032411 | A1 | * | 1/2015 | Hoferer ................ G01F 23/284 |
| | | | | 702/154 |

FOREIGN PATENT DOCUMENTS

| | | |
|---|---|---|
| DE | 3107444 | 10/1982 |
| DE | 4407369 | 9/1995 |
| DE | 101 40 821 | 3/2003 |
| DE | 10140346 | 3/2003 |
| DE | 10164030 | 7/2003 |
| EP | 0573 034 | 12/1993 |
| EP | 0 699 307 | 11/1995 |
| EP | 1 235 059 | 8/2002 |
| EP | 2369362 | * 9/2011 |
| WO | 94/27165 | 11/1994 |

OTHER PUBLICATIONS

Definition of Intermediate Frequency, Britannica Online Encyclopedia, 2008.*
"Nyquist Frequency", Wolfram Research, 1999-2010.*
Natural Number, Wolfram MathWorld, p. 1, 1999-2016.*
Bashran et al., "Active sonar for obstacle localization using envelope shape information", IEEE, US, Bol, vol. 2, Conf. 16. Apr. 14, 1991, pp. 1273-1276.

* cited by examiner

PAIRED ZF SAMPLING FOR PULSE RUNNING TIME FILLING LEVEL SENSOR

REFERENCE TO RELATED APPLICATIONS

This application claims the benefit of the filing date of German Patent Application Serial No. 10 2006 006 572.7 filed Feb. 13, 2006 and U.S. Provisional Patent Application Ser. No. 60/772,701 filed Feb. 13, 2006, the disclosure of which applications is hereby incorporated herein by reference.

FIELD OF THE INVENTION

The present invention relates to level measuring. In particular, the present invention relates to a method for level measuring for a pulse running time filling level sensor, and a level measuring instrument, which determines the filling level of a filling material in a container according to the pulse running time method.

BACKGROUND INFORMATION

For continuous filling level determination in containers, containing e.g. liquids or bulk materials, frequently sensors are used, which measure according to the pulse running time method the running time of electromagnetic or sound waves from sensor to filling material surface and back. From the interval, determined from the pulse running time via the wave propagation speed, between sensor and filling material surface, if the sensor's location of installation with respect to the container bottom is known, the desired filling level may be calculated directly.

Sound waves may be generated and radiated by so-called ultrasound filling level sensors approximately in the range from 10 kHz to 100 kHz by means of electromechanical sound transducers. The reflected sound pulses are either received by the same sound transducer, or by a second transducer, provided only for receiving, and evaluated regarding their running time with respect to the time of transmission.

Electromagnetic waves, which may be located in a frequency range between approximately 0.5 and 100 GHz, are radiated and received again by the sensor, usually via antennas. In addition, instruments are known, which return the wave along a wave guide from the sensor to the filling material. The reflection of the waves at the filling material surface is due to the variation of the propagation impedance for the wave at this point.

The pulse radar method takes advantage of the generation of short coherent microwave pulses, so-called bursts, and determines the direct period between transmission and receipt of the pulses. For ordinary measuring distances, ranging up to several meters, the time intervals to be measured are extremely short, which is the reason why with pulse radar sensors, the echo signal received may be appropriately retarded through a time transformation method. Such a method is described in DE 31 07 444. It supplies a retarded echo signal corresponding to the high frequency transmit and receive signal received, but which is slowed down, e.g. by a factor of between 10,000 and 100,000. A carrier wave frequency of the microwave pulse of e.g. 5.8 GHz is transformed into a carrier wave frequency of the retarded echo pulse between e.g. 58 kHz and 580 kHz. This signal, created internally by time transformation, is in general also called intermediate frequency signal, or abbreviated as IF signal, and is usually situated between 10 kHz and 1 MHz, e.g. between 50 kHz and 200 kHz. As mentioned before, this IF signal is a retarded image of the time course of the transmitted and received microwave pulses. Both regarding the frequency range and the nature of the amplitude course, the IF signal of the pulse radar method and the echo signal of the ultrasound method are similar, which is the reason why further processing and evaluation of these signals for determining the relevant echo running time, and thus the measuring distance, may be the same except for minor differences. Therefore, if in the subsequent description, IF signals are mentioned, these are meant to imply not only the retarded representations of the microwave signals, but also the ultrasound echo signals having basically the same aspect.

An IF signal contains a time course of individual pulses, starting with a reference pulse or echo derived from the transmit pulse, via various pulses or echoes from reflection points in the propagation path of the waves, where the impedance of the propagation medium changes. Each pulse consists of a carrier wave of a certain fixed frequency with a pulse shaped amplitude course defined by the shape of the transmit pulse. The totality of all echoes for a given time between the occurrence of the reference echo and the maximum required running time for a relevant measuring range makes up the IF signal. A measuring cycle of a filling level sensor in question is characterized by the formation of at least part of an IF signal, but usually one or more complete IF signals, and subsequent signal processing, evaluation, measurement value formation, and measurement value output, making use of the IF signal formed. Periodical repetition of measuring cycles may ensure updating of measurement values in order to follow up on variable filling levels.

In order to separate in a possibly occurring variety of echoes within one IF signal the one echo from the filling material surface from additionally occurring clutter, the individual echoes have to be recognized by means of characteristic features. One important feature is the course of the amplitude of an echo, with an amplitude rise at the beginning, a maximum amplitude, and an amplitude decay at the end of the echo. This amplitude course is obtained by forming the envelope of the IF signal. In envelope formation, the information on the carrier wave phase course of the echoes is usually lost. However, as taking advantage of knowing the phase course may allow for a significant increase in measuring accuracy, methods are known, wherein in addition to mere envelope information, also phase information of an IF signal is evaluated.

The desired running time of the echo from the filling material surface results from the time interval between reference echo and filling material echo. This may be determined from the interval of two characteristic points of the envelope, e.g. the peak interval of both echoes or of envelope points on the echo edge, which have a defined amplitude relation with the peak. With phase information, this running time information derived from the envelope may be corrected, resulting in higher accuracy.

An example of such two-part signal processing and evaluation of the IF signal may be found in DE 44 07 369. The level measuring instrument described therein comprises an analog signal processing channel for forming the envelope, and a channel parallel thereto with an analog quadrature demodulator for the IF signal for generating a first quadrature signal representing the real part of the IF signal and a second quadrature signal representing the imaginary part. Due to the analog construction of both channels, certain problems caused by component tolerances and long term drift appear in signal processing, which may lead to a decrease in measuring accuracy.

Furthermore, it has to be noted that the amplitude differences between echoes of well reflecting surfaces at close range and poorly reflecting surfaces at the end of the measurement range may be very large. Amplitude differences of more than 120 dB, corresponding to a stress ratio of 1 to one million, may appear, and may have to be handled by the sensor's signal processing. If for envelope formation, the common method of half or full wave rectification is used, e.g. via analog diode circuits, with subsequent low-pass filtering, such a dynamic range can hardly be managed. In order to alleviate the requirements, an IF signal amplifier may be implemented with variable amplification adapted to the echo running time. This amplification control or STC (sensitivity time control) may reduce the required dynamic range of all subsequent stages of signal processing. Alternatively, it may be possible to vary the amplification gradually within the IF signal, or between different successive IF signals. Thereafter, the amplitude information of the individual stages with reduced dynamic range may be summed up to information with full dynamic range. The logarithmic processing of the signal for compressing the envelope amplitudes may be another method. An example of such signal processing with a hardware logarithmizer, which at the time of logarithmizing also performs signal rectification, and thus, together with subsequent low-pass filtering, may allow for the logarithmic envelope to be formed, is found in DE 101 64 030. This document also shows a solution as to how the phase information can also be obtained from the logarithmized signal, and thus the dual processing of amplitude and phase may be minimized.

In order to avoid the disadvantages of largely analog signal processing, e.g. long term drift, component tolerances, and lack of flexibility with respect to variable sensor parameters, a mostly digital processing of the IF signal is to be aimed at. For this purpose, it may be advisable to sample the IF signal, upon possible analog signal amplification and low-pass or band-pass filtering, in order to avoid aliasing, and to convert the time discrete sampling values into a digital value representing the voltage value. This method is called A/D conversion. A digitally stored sampling sequence represents the analog IF signal with echoes contained therein. Both amplitude and phase information of the IF signal is preserved, and available for subsequent digital signal processing. However, the requirements regarding the necessary sampling frequency, the amplitude resolution of A/D conversion, and the memory and computing load of digital signal processing may be problematic. Therefore, analog signal processing and logarithmic envelope formation may be combined with IF digitizing. The echo amplitudes are evaluated from the logarithmic envelope, eventually also digitized, whereas from the digitized IF signal, only additional phase information may have to be derived. Thereby, IF digitizing may be simplified in that it can be restricted exclusively to the two time ranges in the signal containing the reference echo and the relevant echo from the filling material surface. This may save memory space, computing time, and once IF amplification has been adjusted, also amplitude resolution of the A/D converter. However, on the analog side in turn, more circuit means may be required.

Another method of digitally sampling the IF curve is known from DE 101 40 346. It features a relatively low sampling frequency and easy envelope formation, but may require considerable synchronization means for sampling the IF waves exactly at the peaks of the carrier frequency.

SUMMARY OF THE INVENTION

According to an exemplary embodiment of the present invention, a method is proposed, wherein the IF signal is sampled at discrete points in time (i.e. discrete instants), and converted into a digital value, wherein the subsequent processing of the digital values calculates from respectively exactly two digital sampling values adjacent in time at least one new value characterizing the IF curve.

This may lead to a low sampling frequency, low memory means, low computational cost for subsequent digital processing regarding the evaluation of amplitude and phase information, flexible adaptation to variable sensor parameters, high signal sensitivity, and high measuring accuracy.

According to another sample embodiment of the present invention, this value is an envelope value, or a value describing the phase.

It appears that from only two sampling points of the IF signal, approximately one envelope value as well as one phase value may be calculated, if the time interval between the sampling points is known, and certain time intervals are avoided. With an adequate choice of the sampling interval, the calculated envelope value may be so close to the actual value that the remaining error is negligibly small.

According to a sample embodiment of the invention, the remaining error may be further decreased by an iterative approximation method, if the slope of the envelope at the point to be calculated is known. The slope in turn may be estimated very well from the course of several adjacent envelope points calculated by approximation.

According to a sample embodiment of the inventive method, two sampling values consecutive in time always form a sampling pair, wherein the time interval ta1 between the two points of a pair is less than half the interval ta2 between consecutive sampling pairs.

Furthermore, the time interval between the two points of a pair may be chosen so as to be smaller than half a period of the IF carrier wave. All time intervals of the two points of a sampling pair corresponding to half a period of the IF, or a multiple thereof, are to be avoided at any rate. Also, the sampling interval for a pair of points may be controlled in a precise manner so that it corresponds to a quarter of the period of the IF carrier frequency. However, otherwise the interval may be defined as about one eighth of the IF period.

According to a sample embodiment of the invention, the time interval ta2 between consecutive sampling pairs may be chosen to be so large that all of the sampling and digitizing of the IF signal now no longer satisfies the Nyquist sampling theorem. The basis therefore is the limited bandwidth of the IF signal resulting from the pulse shaped nature of the echo signals contained therein. Such under-sampling allows for certain savings in terms of power consumption of A/D conversion, memory requirements, and computing time.

In accordance with a first configuration, depending on the IF frequency $f_{IF}$ and IF bandwidth B, the time intervals ta2 of the consecutive sampling pairs are chosen according to the following aspects: The duration must be less than the reciprocal value of twice the IF bandwidth, i.e. ta2<1/(2*B), and the sampling duration must not be within the range between ta2=n/(2*$f_{IF}$+B), and ta2=n/(2*$f_{IF}$−B), wherein n=1, 2, 3, . . . .

There are so-called stop bands, wherein sampling aliasing effects may alter the signal. However, all other intervals between the sampling pairs may be chosen, whereby a method thus implemented in a sensor may be adapted very flexibly to various requirements.

In order to avoid undesirable DC components in the sampled IF signal, it may be appropriate, to place the interval ta2 between the sampling pairs approximately half-way between two forbidden areas. Then, through digital band-pass filtering of all digital values of an IF curve, both an interfering DC component and other interfering signals, e.g. noise, close to the IF frequency band can be eliminated. Such digital band-pass filtering can be applied e.g. separately to respectively the group of all first sampling values of all pairs and the group of all second values of all pairs of the IF curve.

Alternatively to the choice, which as just been described, of the time interval between the sampling pairs, this may also be exactly the period of the IF carrier frequency or an even-numbered multiple thereof. In this case, noise components, but no DC components, of the IF signal may be filtered out digitally. In this case, instead of a digital band-pass filter, a digital low-pass filter may be sufficient. In addition, a coherent system averaging of the sampled IF values may be performed. The term system averaging designates a formation of the mean value over several values corresponding in time of different consecutive IF curves.

According to a sample embodiment of the present invention, the two digital sampling values are adjacent in time.

According to a sample embodiment of the present invention, the time interval of both digital sampling values is one quarter of the IF frequency period.

According to a sample embodiment of the present invention, the envelope is formed as the root of a sum of squares of the two digital sampling values.

According to a sample embodiment of the present invention, the time interval of the two digital sampling values is one eighth of the IF frequency period.

According to another sample embodiment of the present invention, the digital sampling values are assigned alternately to one of two groups, wherein the characteristic value is calculated from respectively one value of each group.

Prior to computing, digital filtering of each group, or coherent system averaging of each group can be performed.

The time intervals of the digital sampling values of each group can be smaller than the reciprocal value of a double bandwidth.

According to another sample embodiment of the present invention, the time intervals of the digital sampling values of each group are greater than the reciprocal value of a double frequency, so that they don't satisfy the sampling theorem.

According to another sample embodiment of the present invention, for the time intervals of the digital sampling values of each group, the following holds true:

$$\text{Time intervals} \notin \left[\frac{n}{2 * f_{IF} + B}, \frac{n}{2 * f_{IF} - B}\right],$$

with
$f_{IF}$: IF carrier frequency
B: bandwidth of the IF signal
n: natural number, n=1, 2, 3, . . . .

According to another sample embodiment of the present invention, the time intervals of the digital sampling values of each group are situated approximately half-way between two stop bands.

$$\text{Time intervals} \approx \frac{2 * f_{IF} * (2 * n + 1) - B}{8 * f_{IF}^2 - 2 * B^2}$$

Furthermore, digital band filtering of each group with a center frequency of about one quarter of the sampling frequency may be performed.

The time intervals of the digital sampling values of each group may correspond to the IF frequency period or a multiple thereof.

Also, digital low-pass filtering of each group may be performed.

The envelope value $HK_i$ and the phase value $\phi_i$ may be calculated from the two sampling values of one group respectively according to $$HK_i = \sqrt{IF1_i^2 + \frac{(IF2_i - IF1_i * \cos(\omega * (ta1_i)))^2}{\sin(\omega * (ta1_i))^2}}$$

$$\tan(\varphi_i) = \frac{\sin(\omega * t2_i) * IF1_i - \sin(\omega * t1_i) * IF2_i}{\sin(\omega * t1_i) * IF2_i - \cos(\omega * t2_i) * IF1_i}$$

wherein:
i: running variable, i=0, 1, 2, . . . .
$HK_i$: envelope value
$\phi_i$: phase value
$ta1_i = t2_i - t1_i$; time interval between sampling of $IF1_i$ and $IF2_i$
$IF1_i$: sampling value from the first group
$t1_i$: sampling instant of $IF1_i$
$IF2_i$: sampling value from the second group
$t2_i$: sampling instant of $IF2_i$
$\Omega := 2 * \pi * f_{IF}$; angular frequency of the IF carrier wave According to another sample embodiment of the present invention, the phase value is computed from sampling values and envelope values.

According to another sample embodiment of the present invention, the time interval between two consecutive sampling pairs is greater than half the period of the IF signal.

According to another sample embodiment of the present invention, the interval between two consecutive sampling pairs does not match exactly one period.

According to another sample embodiment of the present invention, for the time interval ta2 between two consecutive sampling pairs, the following further holds true:

$$ta2 \notin \left[\frac{n}{2 * f_{IF} + B}, \frac{n}{2 * f_{IF} - B}\right],$$

with
$f_{IF}$: IF carrier frequency
B: bandwidth of the IF signal
n: natural number, n=1, 2, 3, . . . .

According to another sample embodiment of the present invention, a pulse running time filling level sensor for determining a filling level in a container is proposed, the filling level sensor comprising a sampling device for sampling an IF signal at discrete points in time (or time instants), and for converting sampling values into digital sampling values, and a digital signal processing device for subsequent processing of the digital sampling values through calculation of at least one new value characterizing the IF curve from respectively exactly two digital sampling values.

Hereafter, with reference to the figures, preferred sample embodiments of the present invention will be described.

BRIEF DESCRIPTION OF THE DRAWINGS

FIG. 4 a and b show a signal processing flow-chart of the signal processing according to various embodiments of the invention.

The illustrations in the figures are schematic and not to scale.

In the following description of the figures, the same reference symbols will be used for identical or similar items.

DETAILED DESCRIPTION

Figure 1:
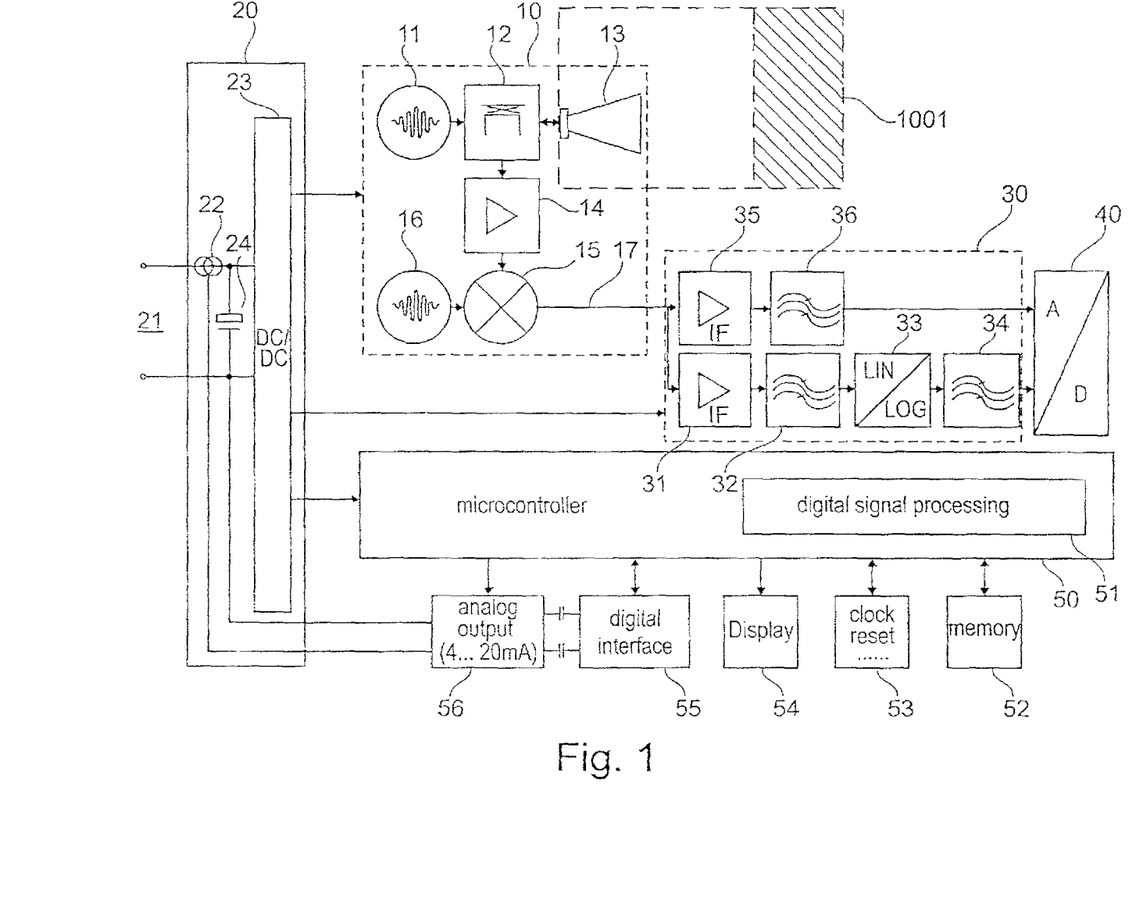
FIG. 1 shows a functional diagram of a radar filling level sensor.

FIG. 1 shows a radar filling level sensor for determining a filling level in, for example, a tank 1001, operating according to the pulse running time method, with a high frequency circuit section 10, a power unit 20, analog signal processing 30, an A/D converter 40, and a microcontroller 50 with peripherals, e.g. memory 52, display 54, clock and reset circuit 53. The sensor is supplied for instance via the two-wire circuit 21, which also outputs the filling level value in analog form, applied by the power source 22 and the controller 56, as a current of 4 . . . 20 mA. On the supply line 21, digital communication of the sensor with the outside may also take place simultaneously. Materially, this may be made possible by means of the digital interface 55. As is known to those skilled in the art, the power unit contains a DC/DC converter 23 with series-connected memory capacitor 24 for supplying all other circuit sections.

Figure 5:
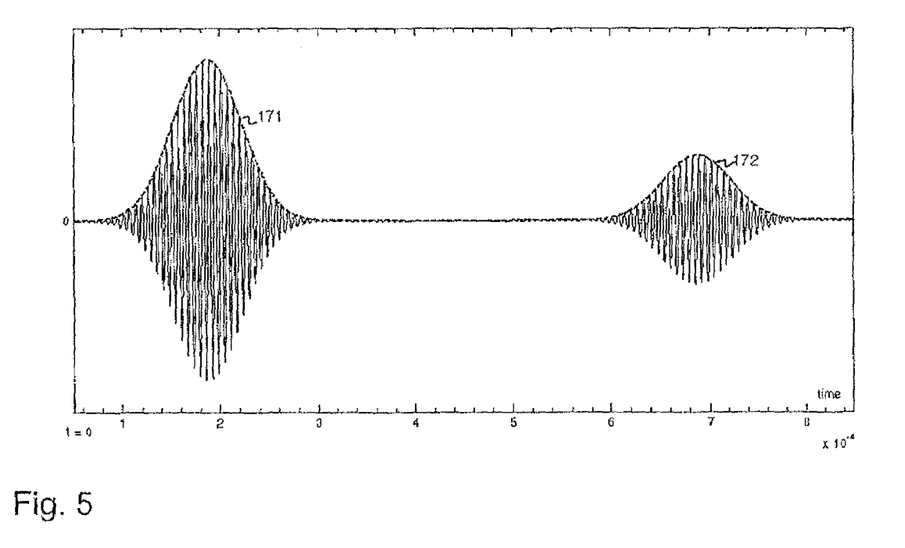
FIG. 5 shows an ideal IF signal.

The high frequency circuit 10 contains a transmit generator 11 for generating high frequency transmit pulses with a predefined pulse repetition frequency. They are directed via the directional coupler 12, or alternatively via a circulator, to the antenna 13, and radiated therefrom. A given part of the transmit pulses directly reaches the receiving amplifier 14 via the directional coupler 12, and forms a time reference stamp, or more simply put a reference echo. At a later time, the echo from the reflection of the transmit pulse sent at the filling material surface, and possibly echoes of other existing obstacles in the propagation path of the microwaves, will follow. These echoes are received by the antenna 13, and directed via the directional coupler 12 to the receiving amplifier 14. Both the reference echo and the other echoes reach the sampler or mixer 15, after amplification. Therein, they are sampled with a second pulse train, which is generated in the sampling generator 16. As a result of this sampling, an IF signal 17 is created, which contains in retarded form all echoes of the high frequency signal of the receiving amplifier 14. In this respect, reference is made to DE 31 074 44, which describes the operation of this retarding method in detail. A very schematic, idealized IF signal 17 is shown in FIG. 5. For this example, a radar frequency of 24 GHz and a retarding factor of 150,000 were chosen. Thereby, an IF carrier wave of 160 kHz is created. The propagation constant of the microwaves, resulting from light speed, of 3.33 ns/m is retarded to 0.5 ms/m. Due to the round trip, a time difference of 1 ms may thus be created between two echoes, the mutual interval thereof being 1 m. The echoes of an IF signal are plotted at this time scale. In the idealized IF signal of FIG. 5, for simplicity's sake, only two echoes with a mutual interval of 0.5 ms, respectively of 0.5 m, are plotted. The echo 171 is the reference echo, whereas the echo 172 is the reflection from the filling material surface. As already mentioned, real IF signals often contain further clutter, making signal evaluation more complicated. The duration of the IF signal depends on the sensor's measuring range of interest. In FIG. 5, for improved illustration of the IF wave, the measuring range was chosen very short.

Each echo of the IF signal consists of an amplitude modulated carrier wave with the IF frequency. The desired interval information may be determined from the amplitude course, and possibly also from the phase course.

In order to obtain this information, according to the method represented in FIG. 1, or the circuit represented in FIG. 1, the IF signal 17 may be processed by analog signal processing 30, and then, converted into discrete digital values with the analog-digital converter 40. These digital values are saved in memory 52, so that the microcontroller 50 can have access thereto.

In the represented embodiment, the processing of the analog signal is mainly performed separately by amplitude and phase information. For amplitude information, so far the implementation of a hardware logarithmizer 33 has come to mind, which may rectify and logarithmize the IF signal. For adapting the IF signal 17 to the level range thereof, the amplifier 31 is used, whereas the band-pass filter 32 improves the detectability even of the smallest echoes by filtering out, in as far as possible, all clutter outside the frequency band of the IF frequency. The low-pass filter 34 after the logarithmizer smoothes the envelope created by eliminating IF frequency components. If the amplitude dynamic range in the IF signal exceeds the dynamic range of the logarithmizer 33, then the IF amplifier 31 may be varied regarding the amplification thereof. This variation of amplification can take place gradually or continuously for the duration of an IF signal, or else stepwise from one IF signal to the next. If the variation of amplification applied is known, the digitized logarithmic envelops thus created can be corrected and grouped by the microcontroller 50 so that correct amplitude information for all echoes is available.

The signal path with the IF amplifier 35 and the band-pass filter 36 serves to obtain phase information. The IF amplifier 35 adapts the IF signal in amplitude to the voltage range of the A/D converter 40, and the band-pass filter 36 also serves both to filter out noise components and as an anti-aliasing filter for the subsequent analog-digital conversion.

When transitioning from analog to digital level, the Nyquist sampling theorem may have to be noted, which indicates that the sampling frequency must be at least twice as high as the highest frequency occurring in the signal. In order to satisfy this condition, on the one hand, the analog low-pass or band-pass filtering of the IF signal before sampling, and on the other hand, rather large-scale oversampling may be advisable, which in the above mentioned example leads to sampling frequencies of over 500 kHz. Knowing, as already mentioned, that the amplitude dynamic range in the IF signal can be very large, an A/D converter with high amplitude resolution, i.e. with high bit width, has to be chosen. However, such relatively fast A/D converters, which at the same time offer high resolution, are hardly available in the light of the additional aspects of lower power consumption and reasonable cost. In view of reducing the required amplitude resolution of the converter, of course, as described above, in the formation of the analog envelope, an analog IF amplifier 35 with STC functionality, or an amplifier with stepwise amplification may be provided, too. In case of stepwise amplification, several digitized IF signals of variable amplification may be combined mathematically into a complete IF signal with high dynamic range. The same applies for the stepwise switching of the amplification within an IF signal. Of course, it may also be possible to use instead of an IF amplifier variable in amplification, several amplifiers of parallel construction of variable amplification, the signals of which are converted by the A/D converter almost at the same time, or else consecutively. However, at any rate, it is to be noted that for the benefit of a reduced amplitude resolution of the A/D converter, higher demands are made in terms of sampling frequency, memory requirement and/or load or processing speed of the microcontroller 50 for digital signal processing.

Figure 6:
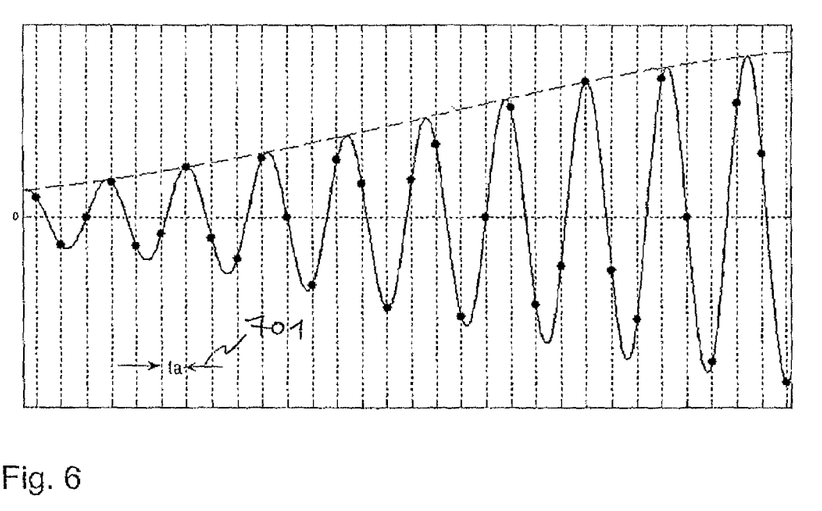
FIG. 6 shows a detail of the IF signal of FIG. 5 with marking of IF samplings according to the state of the art.

A detail of an IF signal sampled according to the Nyquist sampling theorem is shown in FIG. 6. The first half of the echo 172 of FIG. 5 is shown with the original IF curve 17 and the equidistant sampling points in the time interval ta, from which a digital value is formed. Furthermore, a dashed line shows the envelope. The sampling interval ta represented in this example is 1.95 µs corresponding to a sampling frequency of 512 kHz, which is about three times the IF carrier frequency of 160 kHz.

Figure 2:
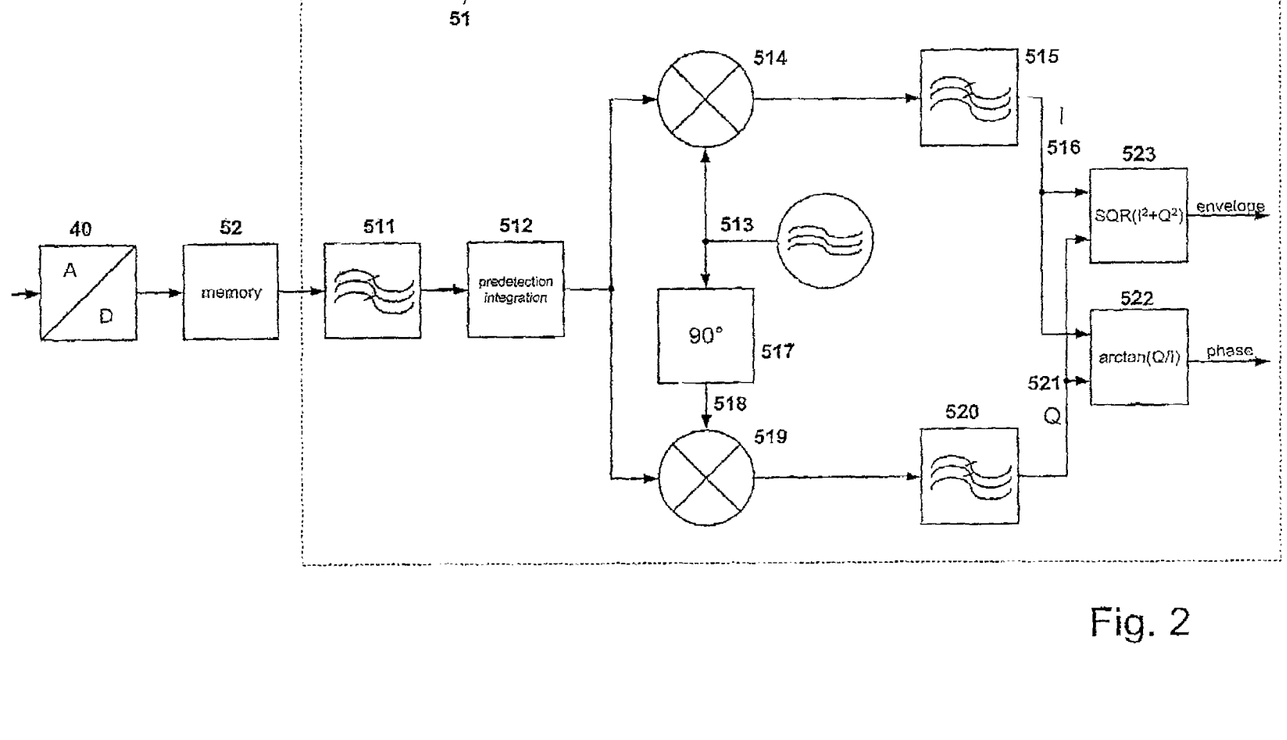
FIG. 2 shows a signal processing flow-chart of a signal processing with a quadrature demodulator for evaluating envelope and phase.

For the digital signal processing of these sampling values in the signal processing software 51, the implementation of the method of quadrature demodulation is appropriate, which is represented schematically in FIG. 2. The IF signal values, sampled and digitized by the A/D converter 40, which are available in memory 52, can be filtered, if required, in the band-pass filter 511 in order to improve the signal/noise ratio. For this purpose, digital filter algorithms known to those skilled in the art, like FIR (finite impulse response) and IIR (infinite impulse response) filters, are suitable. Further improvement of the signal/noise ratio can be obtained, if required, by system averaging or predetection integration 512. This is a mean value formation of the sampling values of various consecutive IF signals. Those values are averaged respectively, which were sampled at the same relative time intervals with respect to the beginning of the IF signal.

The IF sampling values thus filtered are then multiplied in the multiplier 514 with a mathematically generated sine signal 513 of the same frequency. This corresponds to frequency conversion to the carrier frequency of zero. Higher frequency components created at the same time are filtered out by the digital low-pass filter 515. In parallel, the IF signal values are multiplied in the multiplier 519 with a mathematical cosine signal 518, resulting from the 90° shift of the sine in the phase shifter 517, and also filtered in the low-pass filter 520. The inphase (I) 516 and quadrature (Q) 521 components thus calculated are the basis for calculating the phase (522), and possibly also the envelope (523). Here, the phase is calculated from the arc tangent of the quotient, phase=arctan(Q/I), the envelope from the root of the sum of squares, envelope=SQR(I^2+Q^2).

In comparison with an analog version, this digital quadrature demodulation may be independent from component tolerances, and easy to adapt to variable conditions. However, through digitizing according to the sampling theorem, relatively many digital values are created, to which relatively many arithmetic operations according to the diagram of FIG. 2 may have to be applied. This may result in relatively high memory requirements and high computing load for the microcontroller 50, which leads to compromises in as far as manufacturing cost, electrical consumption, and cycle time of measurement value updating is concerned, which are far from ideal.

Globally, it appears from FIGS. 1 and 2 and the explanations thereof that the analog and digital signal processing of IF signals described therein is very demanding in as far as computing time, electrical consumption, and cost is involved, if the measurement values output by the filling level sensor are to be very accurate.

Figure 3:
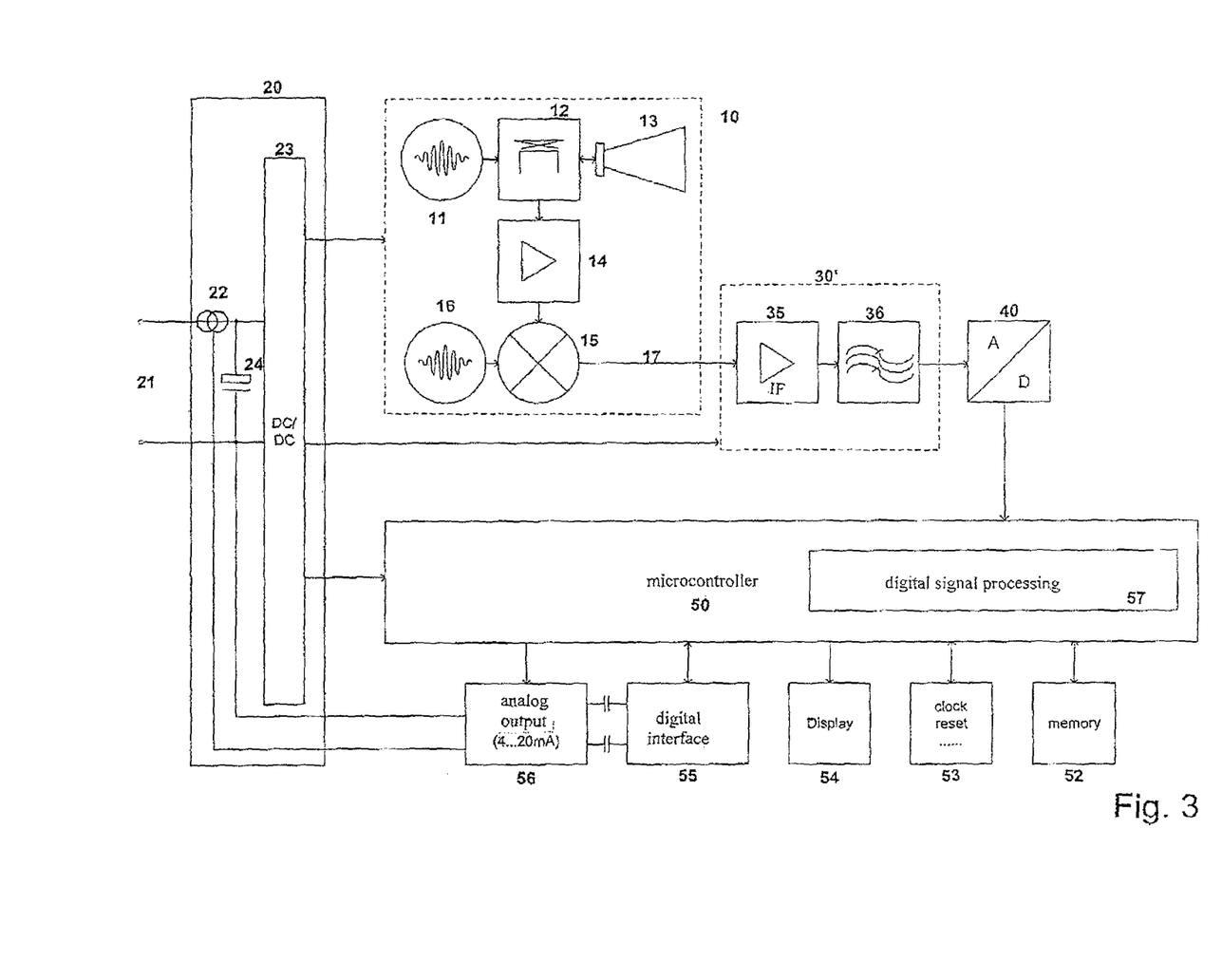
FIG. 3 shows a functional diagram of a radar filling level sensor for carrying out the inventive method.
Figure 4A:
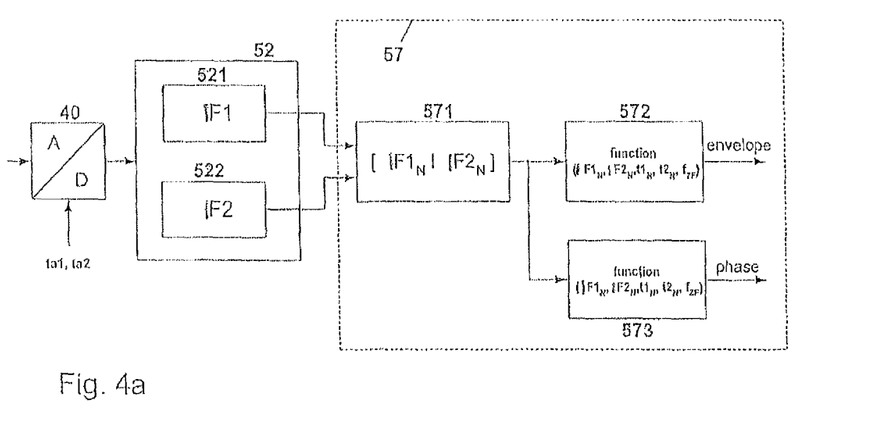
Figure 4B:
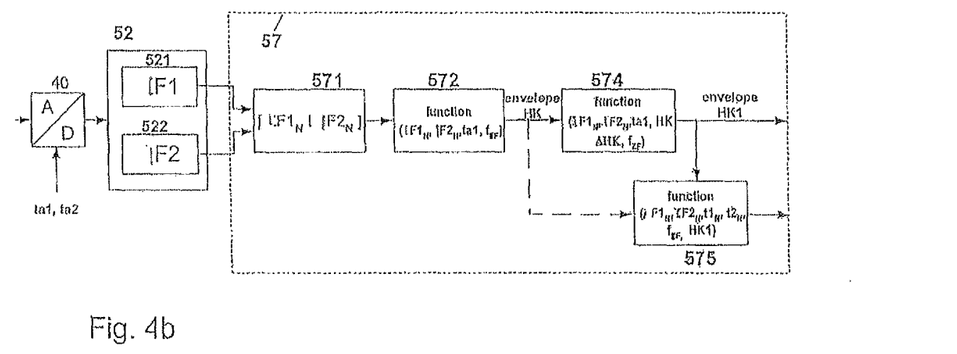

In contrast, FIGS. 3 and 4 show sample embodiments for analog and digital signal processing according to the present invention.

Herein, FIG. 3 differs from FIG. 1 only regarding the analog signal processing 30' and different digital signal processing 57. The branch for analog formation of the logarithmic envelope was omitted in this example, because according to the invention, the envelope may be calculated very easily from the sampled digital values of the IF signal.

For this purpose, as represented in FIG. 4a, the sampling values of an IF signal are divided into two groups IF1 (521) and IF2 (522). In the simplest case, this is done by assigning all IF values consecutively sampled by the A/D converter at the sampling time intervals ta1 701 and ta2 702 alternately to one of both groups. It has appeared herein that from a value pair 571, consisting respectively of one sampling value from each group, a corresponding envelope value 572 and/or phase value 573 can be calculated for the IF signal. It is assumed that the IF frequency $f_{IF}$ is well known. Furthermore, the sampling instants of all sampling values must of course be known, wherein not absolute, but relative instants with respect to a beginning instant of the IF signal are relevant. With a given sampling raster, the instant may e.g. result simply from the memory address where the value was stored.

Figure 7:
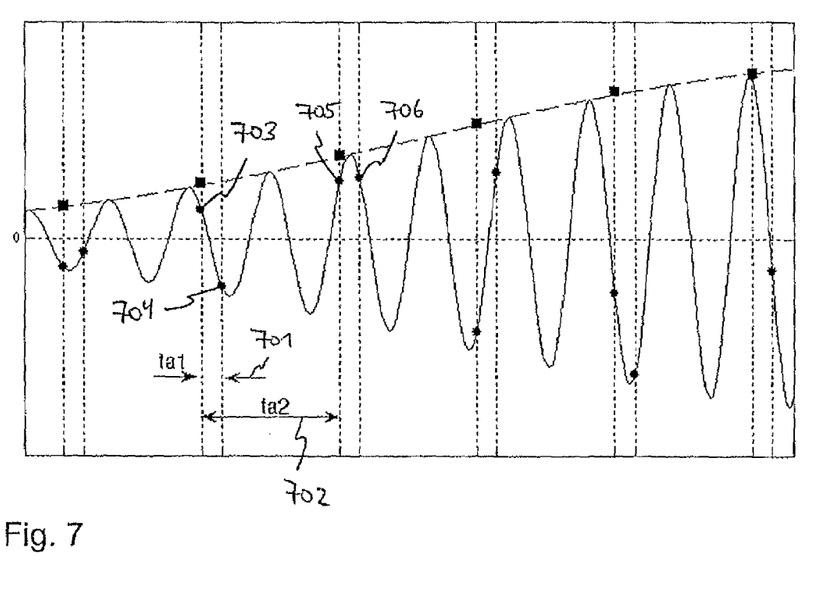
FIG. 7 shows a detail of the IF signal of FIG. 5 with marking of IF samplings according to an exemplary embodiment of the inventive method.

The formulae of calculation for the individual values i of the envelope and the phase are:

$$HK_i = \sqrt{IF1_i^2 + \frac{(IF2_i - IF1_i * \cos(\omega * (ta1_i)))^2}{\sin(\omega * (ta1_i))^2}} \quad (1)$$

$$\tan(\varphi_i) = \frac{\sin(\omega * t2_i) * IF1_i - \sin(\omega * t1_i) * IF2_i}{\sin(\omega * t1_i) * IF2_i - \cos(\omega * t2_i) * IF1_i} \quad (2)$$

wherein:
i: running variable, i=0, 1, 2, . . . .
$HK_i$: envelope value
$\varphi_i$: phase value
$ta1_i$=$t2_i$−$t1_i$; time interval between sampling of $IF1_i$ and $IF2_j$
$IF1_i$: sampling value from the first group
$t1_i$: sampling instant of $IF1_i$
$IF2_i$: sampling value from the second group
$t2_i$: sampling instant of $IF2_i$
Ω: =2*π*$f_{IF}$; angular frequency of the IF carrier wave These calculated values may not yield with mathematical accuracy the desired amplitudes of the envelope and phase values. An error may occur, which depends on the variation of the envelope between the two points of a pair. The bigger the envelope variation, the greater the possible error. Therefore, the time interval between the two sampling instants of one pair may be kept relatively small. FIG. 7 shows for the same time detail of the IF signal as in FIG. 6 a favorable sampling raster. Two samplings in the time interval of ta1 701 are performed cyclically, wherein the first value is assigned to the first group, and the second one to the second group. This is repeated for time interval ta2 702. The respective sampling values are plotted as points on the IF signal. The envelope values calculated from each sampling pair according to the formula above can be seen in FIG. 7 as solid squares on the ideal envelope plotted with a dashed line. In this example, for the time interval ta1, a time corresponding to one quarter of the IF frequency period was chosen. During this time, the envelope value only changes negligibly, so that the calculation error created is relatively small. The choice of one quarter of the period is favorable because in this case, $\pi/2$ results from the calculation of the envelope according to the formula (1) as the arguments of the sine and cosine functions appearing therein. Thereby, calculating the formation of the root from the sum of squares of the two sampling values is simplified:

$$HK_i = \sqrt{IF1_i^2 + IF2_i^2} \quad (3)$$

Furthermore, it is to be noted that in addition to intervals ta1 to be chosen advantageously, it may also be necessary to avoid certain intervals. These are all time intervals ta1 corresponding to half of the IF frequency period, and all multiples thereof.

Another very favorable time interval ta1 701 has proved to be the one corresponding approximately to one eighth of the IF frequency period, as during this very short time, the envelope variation, and thus the calculation error, is very small.

Another or additional way for reducing the error results from a mathematically enhanced calculation approach, wherein the amount of envelope variation $\Delta HK_i$ between the two sampling points of a pair has to be determined in addition. Herein, an iterative approximation method is appropriate, wherein first the still error prone envelope values are calculated according to the formula (1) above. From the envelope values $HK_{i-1}$ and $HK_{i+1}$ adjacent to a given envelope point, the approximate slope of the envelope is calculated from the straight line through both adjacent points, and therefrom the first approximation of the envelope variation $\Delta HK_i$. Then, the following iterative calculation is applied for improved determination HK1 of this given envelope value $HK_i$:

$$HK1_{j+1} = HK1_j - \frac{a4 * HK1_j^4 + a3 * HK1_j^3 + a2 * HK1_j^2 + a1 * HK1_j + a0}{4 * a4 * HK1_j^3 + 3 * a3 * HK1_j^2 + 2 * a2 * HK1_j + a1} \quad (4)$$

with $$j = 0, 1, 2, \ldots$$

$$a4 = \sin^2(\omega * ta1_i)$$

$$a3 = 2 * \sin^2(\omega * ta1_i) * \Delta HK_i$$

$$a2 = \sin^2(\omega * ta1_i) * \Delta HK_i^2 + 2 * \cos(\omega * ta1_i) * ZF1_i * ZF2_i - ZF1_i^2 - ZF2_i^2$$

$$a1 = 2 * ZF1_i * \Delta HK_i * (\cos(\omega * ta1_i) * ZF2_i - ZF1_i)$$

$$a0 = -ZF1_i^2 * \Delta HK_i^2$$

and $$HK1_0 = HK_i$$

$$\Delta HK_i = \frac{(HK_{i+1} - HK_{i-1}) * ta1_i}{t1_{i+1} - t1_{i-1}}$$

This iterative approximation method for solving a 4th-order Newton-Raphson equation may be abandoned after any number of steps, and may result in an improvement of the calculated envelope values.

Figure 8:
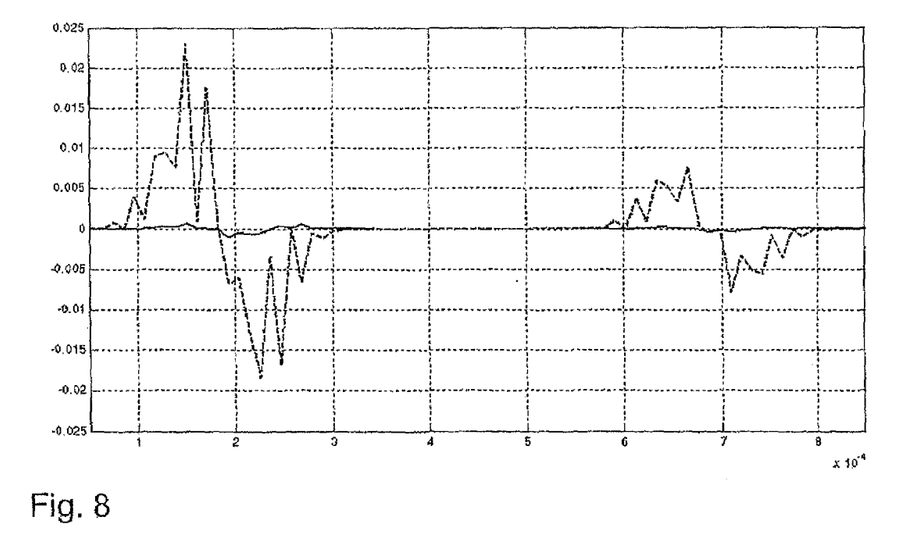
FIG. 8 shows errors in the envelope calculation according to an exemplary embodiment of the inventive method before and after application of the improved calculation method.

FIG. 8 shows the absolute calculation error (calculated value of the envelope minus exact value of the envelope) for the envelope of the IF signal of FIG. 5 when sampling according to the example of FIG. 7 as a dashed line before, and as a solid line after application of 5 iterations of the approximation method, plotted for the time scale. The associated maximum amplitudes are 1 for the reference echo and 0.4 for the filling material echo. It may be seen therefrom that the error is reduced from a maximum of about 2.5% of the correct envelope value to values of a maximum of about 0.1%.

The phase value, which by definition is the phase angle of the carrier wave of a given echo at an instant once defined, can alternatively to the formula of calculation (2) above, wherein just as for the envelope calculation, some error is created, be determined from the much more accurate envelope value according to the application of the approximation method. For this purpose, the IF wave of an echo is to be considered as a complex index, of which the amount (=envelope) and imaginary component (=sampling value) are known at a current instant. Thereby, a current phase angle at this instant can be calculated. The desired phase angle of the echo at the previously defined instant simply results from the time interval between the current and defined instants and the period of the IF carrier wave.

The basic signal processing sequence of this preferred embodiment is represented in FIG. 4b. It is different from the sequence in FIG. 4a only in that in another arithmetic operation 574 the previously determined envelope value is improved by the approximation method described. If required, in another calculation step 575, an exact phase value is determined from the improved envelope value. Of course, as plotted with a dashed line, the phase value may also be derived from the envelope value calculated initially, if application of the approximation method is omitted.

If sampling according to the inventive example of FIG. 7 is compared with sampling of FIG. 6, it is noticed that when applying the inventive method it is now no longer mandatory to satisfy the Nyquist sampling theorem. The interval ta2 702 between the sampling pairs can be chosen freely within certain limits. These limits only result from the IF carrier frequency, and the bandwidth of the IF signal. As it is known, the sampling of a signal can be considered as a multiplication of the signal with a Dirac pulse train. When considered in the frequency range, this corresponds to a convolution of the frequency spectrum of the IF signal with the Fourier transform of the Dirac pulse train. The result of this convolution are a great (in theory infinite) number of frequency bands with IF bandwidth. The repetition frequency of the Dirac pulse train, which determines the sampling interval ta2 702, is responsible for the situation of these frequency bands. For the sampled signal to remain unaltered, the frequency bands must not partially overlap.

This results in the following requirements for the time interval ta2 between the sampling pairs:

$$ta2 \leq \frac{1}{2*B} \quad (5)$$

$$ta2 \notin \frac{n}{2*f_{IF}+B}, \frac{n}{2*f_{IF}-B} \quad (6)$$

with $f_{IF}$: IF carrier frequency

B: bandwidth of the IF signal n: natural number, n=1, 2, 3, . . . .

For the example used so far, with $f_{IF}$=160 kHz and a supposed bandwidth B=20 kHz, it follows that the time interval ta2 should be smaller than 25 µs. Furthermore, the time interval ta2 must for instance not be situated in the range between 2.94 µs and 3.33 µs. The above mentioned inequality results in 7 other stop bands for ta2 for n=2 to 8, which are not all mentioned explicitly herein.

When choosing the appropriate sampling interval ta2, preferably a value about half-way between two stop bands is chosen according to the formula $$ta2 \approx \frac{2*f_{IF}*(2*n+1)-B}{8*f_{IF}^2-2*B^2}$$

With reference to the numerical values mentioned, this is e.g. an interval of about 10.9 µs as represented in FIG. 7, or 7.7 µs or 4.6 µs.

The IF frequency component, which is relevant for further signal processing, is situated for the preferred selection of the sampling interval at about one quarter of the sampling frequency. For the example above with ta2=10.9 µs the midband of the IF band involved is at about 22.9 kHz, the bandwidth being once again 20 kHz. This means that filtering can be applied to the sampling sequences, separated into both groups. In this case, this could be done with a band-pass filter having a center frequency of 22.9 kHz and a bandwidth of 20 kHz. By implementing such a digital filter, the embodiment of which as a FIR or IIR filter is known by those skilled in the art, both noise components, which have not been suppressed by the analog band-pass filter before A/D conversion, and an interfering DC component in the IF signal can be filtered out efficiently.

In contrast with the just described definition of the sampling interval ta2 between the adjacent sampling pairs, it is also possible to choose exactly an interval according to one period of the IF carrier frequency, or of an integer multiple thereof. This has the advantage that the IF signal is reproduced accurately into the baseband, and that instead of the band-pass filter, a digital low-pass filter can be used. However, herein a possible DC component on the IF signal can no longer be filtered out, and the formation of the envelope can thus be altered.

In addition to digital band-pass or low-pass filtering, system averaging of the sampled values also comes to mind. As already mentioned, system averaging is the formation of a mean value for sampling values of different consecutive IF signals, corresponding to the same echo running time. If system averaging is performed before formation of the envelope, then it is coherent system averaging, or else predetection integration, for system averaging of the envelope values it is incoherent system averaging or postdetection integration. Although both methods suppress noise with respect to the echo signal, coherent system averaging is clearly more efficient in this respect. Coherent system averaging can be applied very easily according to the inventive method by separate system averaging of the two sampling groups. In comparison with incoherent system averaging, which can of course be carried out alternatively or additionally with the calculated envelope values, the computational means are merely doubled.

Figure 9:
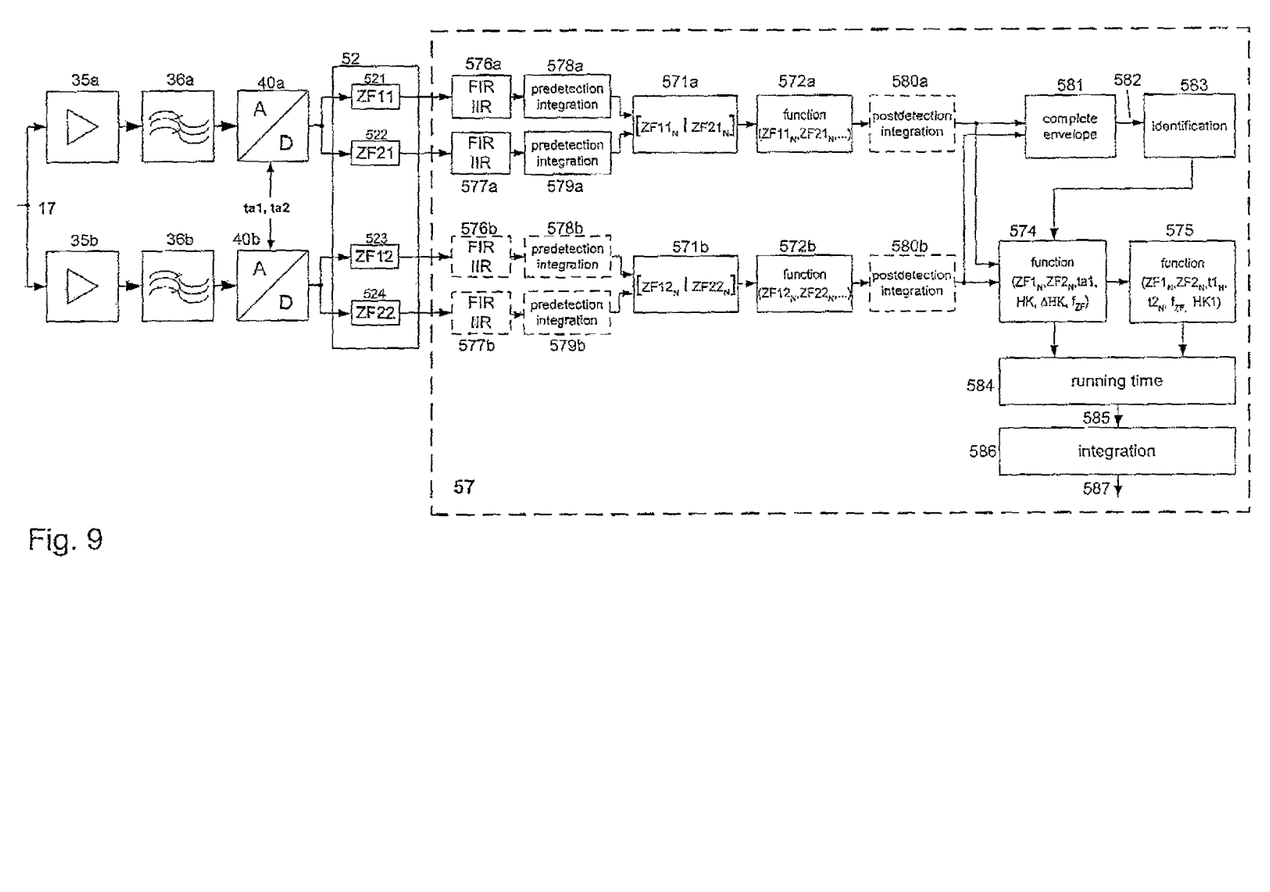
FIG. 9 shows a signal processing graph of analog and digital signal processing according to an exemplary embodiment of the invention.

In FIG. 9, a configuration of analog and digital signal processing for a pulse running time filling level sensor is represented schematically. This version takes into account high signal dynamics in that the IF signal is split into two parallel channels, in which the IF amplifiers 35a and 35b with different amplifications v1 and v2 are provided. Accordingly, there are also two analog band-pass filters 36a and 36b, and two A/D converters 40a and 40b. It is supposed that the resolution of an A/D converter is not sufficient for digitizing both the largest and the smallest echoes. However, if this were possible, then of course a one-channel construction would be sufficient. According to the diagram represented in FIG. 7, each A/D converter converts the sampling values of the IF signal into respectively two groups IF1 . . . and IF2 . . . , which are saved in memory 52 for further digital processing within digital signal processing 57. It is to be noted here in addition that the function of the two A/D converters can also be supported by a single A/D converter provided with at least two inputs. The two groups of digital values, respectively, of which the groups IF11 521 and IF21 522 stand for instance for small echoes and the groups IF12 523 and IF22 524 for large echoes, in a relation of v1>v2, are digitally filtered groupwise if required 576a, 576b, 577a, 577b, and coherently system averaged 578a, 578b, 579a, 579b, as described above. This comes to mind at any rate for the groups of small echoes, as therein echoes may be are partially covered by noise. Thereafter, according to the invention, pairs are formed 571a, 571b, from which the envelope values can be calculated 572a, 572b according to the formula (1) or (3) above. After incoherent system averaging 580a, 580b, if required, the two separate envelops for large and small echoes are combined into one complete envelope 581. For this purpose, all that is required is the knowledge of the difference of amplification between v1 and v2 as well as of some overlap of the two dynamic ranges.

This complete envelope 582 is the basis for the identification 583 of the reference echo and the filling material echo from the totality of echoes of a curve train. The small amplitude errors described above in envelope calculation can be tolerated for this evaluation step without any problem.

For the identification 583 of the two desired echoes, e.g. the following processing steps are required: First of all, from the whole IF signal, individual echoes have to be separated and characterized as to their features. Echo detection resorts e.g. to a threshold value curve, which is either permanently predefined for the instrument, or generated dynamically during operation. The envelope values saved are compared regarding their amplitude with the time dependent threshold. Envelope values situated above the threshold indicate an echo at this location. So as to detect only the relatively largest echoes of an IF signal, it is possible to lower the threshold progressively, until a sufficient amount of echoes has been detected. Detected echoes are characterized for features like e.g. maximum amplitude, noise ratio, echo length, echo shape, mean value, center of gravity, and edge steepness. From these echo features, it is also possible to some extent to draw conclusions as to the type of container, the nature of the filling material surface, and the environmental conditions. Furthermore, from the mutual echo intervals, certain reflection conditions inside the container, such as obliquely positioned bulk material surfaces, or multiple reflecting curved container covers, can be derived. This information can help on the one hand to select application-specific software parameters in view of improved processing of the sampled echo values, and on the other hand, to provide the user, in addition to mere filling level information, also with additional indications on environmental conditions in the container, functional security of the sensor, and measuring in general.

From the totality of the echoes of an IF signal, by means of all features collected, the reference echo and the echo from the filling material surface are finally identified. In particular, the identification of the filling material echo may not be so easy. Methods, which in addition to the mere features of the echoes resulting from the given IF signal also evaluate the history of a measurement, are known from U.S. Ser. No. 11/202,007 (now U.S. Pat. No. 7,333,900) or U.S. 60/601,929, to which reference is made herein.

In order to reach a measurement value for the filling level, the time interval between the reference echo and the filling material echo identified has now to be determined 584. First of all, this measurement 584 resorts to the digital envelope values of both echoes. However, knowing that they, as mentioned already several times, contain small calculation errors, for a limited amount of envelope points, the approximation method according to the formula (4) above can be applied. The relevant points are for instance those of the envelope in the time range of the two echoes to be measured. The information on their time position is transmitted from the block for identification 583 to the block for improving the envelope values after the approximation method 574. For the same points, also a calculation of the phase 575 can be performed so as to further increase the measuring accuracy. As to how to integrate phase values for improvement of the measuring accuracy, reference is made herein to DE 44 07 369.

Figure 10:
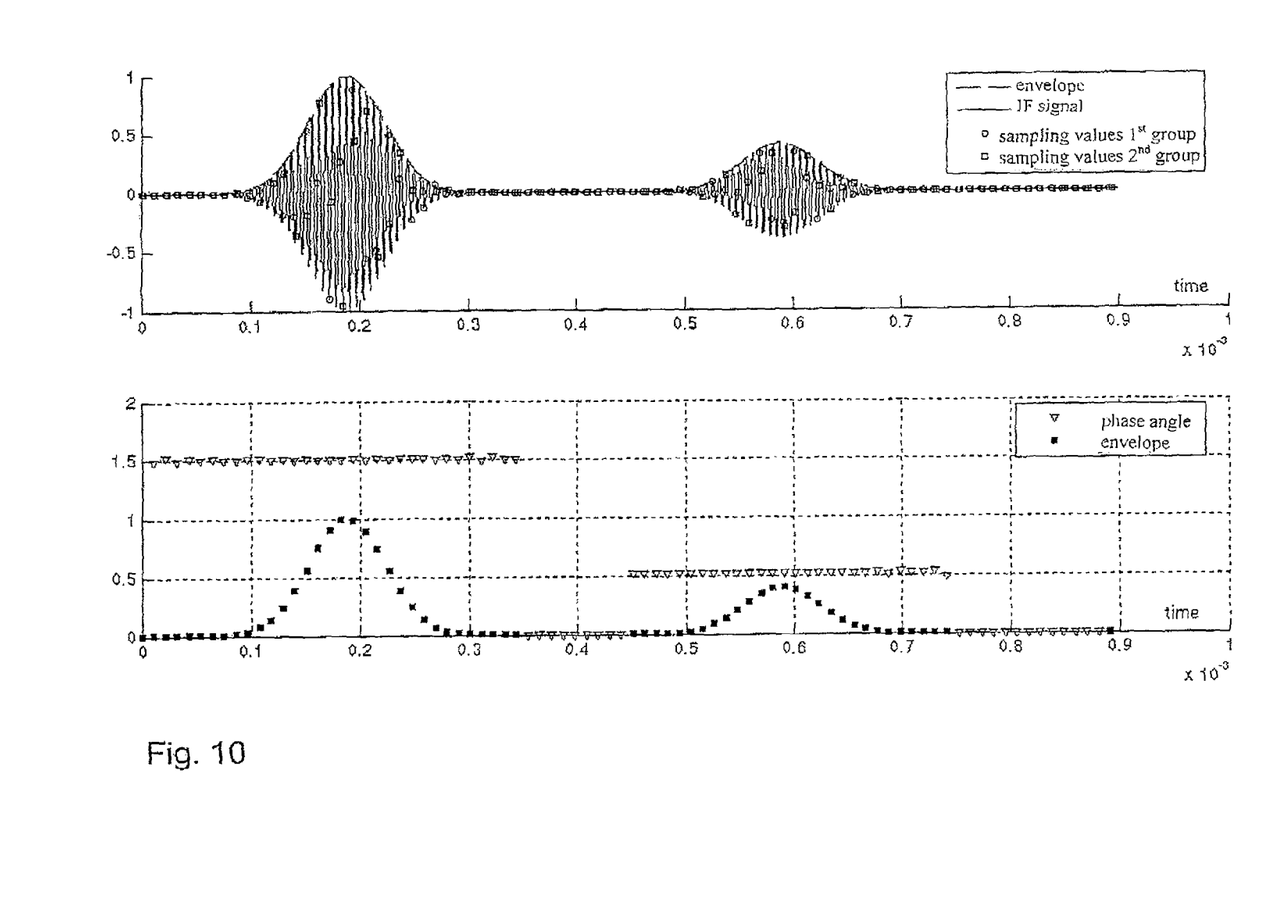
FIG. 10 shows a sample illustration of an IF signal, sampling points, envelope, and phase angle when applying an exemplary embodiment of the inventive method.

FIG. 10 shows individual curve courses or sampling and calculation values from the signal processing chain of FIG. 9. At the top, the idealized analog IF signal, and in addition sampling values taken therefrom as points may be seen. The representation is limited to one of the two channels. At the bottom, the envelope values calculated from respectively one sampling pair, and the phase values derived therefrom in the unit rad may be seen.

When measuring the echo interval 584 on the basis of the envelope values, it appears that the interval between the respective peaks describes the echo interval only very inaccurately. Clearly better results are provided by the measurement between points at the echo edges, the amplitude of which have a defined relation with the respective maximum amplitude of the echo. Further improvement is obtained by interpolation of intermediate points of the sampled envelope points in the area of the echo edges to be measured. Suitable interpolation methods, such as linear interpolation, polynomial interpolation, or spline interpolation, are generally known. Alternatively, there are also methods, wherein the position of an echo is determined in that a previously defined standard echo or a portion thereof is made coincident, as far as mathematically possible, with the points of the echoes currently to be measured. From the position thus defined of the standard echo, the desired time position of the current echo results. Methods for correlating the IF curve or the envelope with a so-called standard echo pursue the same objective. At the instant at which the correlation result is at a maximum, the standard echo best fits the curve involved, which is the reason why at the same time this instant is also representative for the time position of the echo. Eventually, for each measuring cycle, a measurement value 585 for the distance of the filling material echo from the reference echo is created. If the defined sensor and container parameters are known, this value may be converted into a filling level.

Finally, further improvement of the measuring accuracy may be obtained in that such measurement values 585 of various consecutive measuring cycles are averaged 586. The time constant of the averaging may be set permanently, or else, it may be adapted dynamically. If newly determined measurement values are only slightly different from the measurement value determined previously, the time constant is increased to some extent. However, if several new measurement values one after the other are sufficiently different therefrom, this indicates filling material movement, and the time constant should be reduced. Likewise, in some instances, it can be useful to provide a hysteresis for the measurement value output. This is justified if it has to be assumed that the direction of movement of the filling material surface is inverted only rarely, and in this case, a slight delay of the measurement values output is tolerated. The measurement value thus defined 587 is finally the one analogically and/or digitally output by the sensor as the filling level.

It has thus been shown that by sampling relatively few values of the IF signal, the envelope and also the phase angle of the IF signal may be calculated very easily, from respectively only two sampling points. Thereby, the need for memory space and computing time for digitizing and evaluating the IF signal may be considerably reduced, without giving up the advantages offered by mainly digital signal processing. These advantages reside in that one is independent from component tolerances, that processing is easily adapted to variable sensor parameters, that it may be possible to obtain a signal/noise ratio via digital filtering and coherent or incoherent system averaging, and that measuring accuracy may be increased through phase evaluation. Furthermore, the sampling frequency may be adapted to different sensor types and different power supplies of the sensors. For two-wire sensors with analog measurement value output as current picked up between 4 and 20 mA, the power available to the sensor is relatively small. This condition can be coped with by adapting the sampling frequency. It may even be possible to vary the sampling frequency within an IF curve, e.g. in order to sample the relevant areas of reference echo and filling material echo more finely than the remaining areas without the echoes to be measured.

The method may be suitable both for replacing and supplementing the analog logarithmizer mainly used so far with consecutive digitizing of the logarithmic envelope.

The implementation of the invention is not limited to the preferred embodiments represented in the figures. Rather, a plurality of variants can be envisaged, which make use of the represented solution and the inventive concept, even in case of fundamentally different types of embodiments.

Additionally, it is to be noted that "comprising" does not exclude any other items or steps, and that "a" or "an" do not exclude a plurality. Furthermore, it is to be noted that features or steps having been described with reference to one of the above sample embodiments can also be used in combination with other features or steps of other embodiments described above. Reference numerals in the claims are not to be construed as limitations.

What is claimed is:

1. A pulse running time filling level sensor for digitizing and subsequent processing of an intermediate frequency signal for determining a filling level in a tank, comprising:
a sampling device pair sampling the intermediate frequency (IF) signal at pairs of discrete points in time, the sampling device converting sampling values into sampling pairs of digital sampling values, wherein the intermediate frequency signal comprises an amplitude modulated carrier wave having an intermediate frequency; and
a digital signal processing device subsequently processing of the digital sampling values through calculation of at least one characterizing value characterizing the IF signal from respectively exactly one of the digital sampling pairs, and
wherein the at least one characterizing value is an envelope value,
wherein the calculation of the envelope value for the respective sampling pairs is performed according to $$HK_i = \sqrt{IF1_i^2 + \frac{(IF2_i - IF1_i * \cos(\omega * (ta1_i)))^2}{\sin(\omega * (ta1_i))^2}}$$

wherein:
i: a non-negative integer, with i indicating respective ones of the sampling pairs;
$HK_i$ is an i-th envelope value for a respective, i-th, one of the sampling pairs;
$IF1_i$: a respective first digital sampling value of a respective, i-th, one of the sampling pairs;
$IF2_i$: a respective second digital sampling value of a respective, i-th, one of the sampling pairs;
$ta1_i$: time interval between sampling of $IF1_i$ and $IF2_i$; and
ω: angular frequency of the carrier wave.

2. The method according to claim 1, wherein the two digital sampling values within each pair are adjacent in time.

3. The method according to claim 2, wherein the time interval of the two digital sampling values is one quarter of an IF frequency period.

4. A method for digitizing and subsequent processing of an intermediate frequency signal for level measuring using a pulse running time filling level sensor, comprising:
pair sampling the intermediate frequency (IF) signal at pairs of discrete points in time, wherein the intermediate frequency signal comprises an amplitude modulated carrier wave having an intermediate frequency;
converting the sampled IF signal into sampling pairs of digital sampling values; and
calculating from respectively exactly one of the sampling pairs at least one characterizing value characterizing the IF signal;
wherein the at least one characterizing value is an envelope value,
wherein the calculation of the envelope value for the respective sampling pairs is performed according to $$HK_i = \sqrt{IF1_i^2 + \frac{(IF2_i - IF1_i * \cos(\omega * (ta1_i)))^2}{\sin(\omega * (ta1_i))^2}}$$

wherein:
i: a non-negative integer, with i indicating respective ones of the sampling pairs;
$HK_i$ is an i-th envelope value for a respective, i-th, one of the sampling pairs;
$IF1_i$: a respective first digital sampling value of a respective, i-th, one of the sampling pairs;
$IF2_i$: a respective second digital sampling value of a respective, i-th, one of the sampling pairs;
$ta1_i$: time interval between sampling of $IF1_i$ and $IF2_i$; and
ω: angular frequency of the carrier wave.

5. The method according to claim 4, wherein the two digital sampling values within each pair are adjacent in time.

6. The method according to claim 5, wherein the time interval of the two digital sampling values is one quarter of an IF frequency period.

7. The method according to claim 5, wherein the time interval of the two digital sampling values is one eighth of an IF frequency period.

8. The method according to claim 4, wherein the digital sampling values are assigned alternately to one of two groups, wherein each sampling pair comprises the first digital sampling value and the second digital sampling value, wherein one of the two groups is defined by the respective first sampling value from each sampling pair and wherein the other one of the two groups is defined by the respective second sampling value from each sampling pair.

9. The method according to claim 8, wherein the characterizing value is calculated from respectively one value of each group.

10. The method according to claim 8, further comprising:
before the calculating step, digital filtering each group.

11. The method according to claim 10, wherein digital band filtering of each group with a center frequency of about one quarter of the sampling frequency is performed.

12. The method according to claim 8, further comprising:
before the calculating step, coherent system averaging each group.

13. The method according to claim 8, wherein the time intervals of the digital sampling values of each group correspond to the IF frequency period or a multiple thereof.

14. The method according to claim 13, further comprising:
digital low-pass filtering each group.

15. The method according to claim 8, wherein time intervals of the digital sampling values of each group do not satisfy the Nyquist sampling theorem so that the time intervals are larger than a reciprocal value of twice the IF frequency.

16. The method according to claim 4, further comprising:
iteratively improving the envelope value based on an approximation method.

17. The method according to claim 4, further comprising:
calculating a phase value from the sampling values and envelope values.

18. The method according to claim 4, wherein the time interval between two consecutive sampling pairs does not match exactly one period of the IF signal.

* * * * *